(12) United States Patent
Inoue et al.

(10) Patent No.: US 6,618,548 B1
(45) Date of Patent: Sep. 9, 2003

(54) METHOD FOR COPYING, RECORDING, AND EDITING DATA ONTO DISK RECORDING MEDIA, AND DISK RECORDING APPARATUS

(75) Inventors: Shuji Inoue, Kanagawa (JP); Naokazu Susa, Kanagawa (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/312,784

(22) Filed: May 17, 1999

(30) Foreign Application Priority Data

May 15, 1998 (JP) .......................... 10-133785
May 15, 1998 (JP) .......................... 10-133786
May 15, 1998 (JP) .......................... 10-133829

(51) Int. Cl.[7] ..................... H04N 5/85; H04N 27/00
(52) U.S. Cl. ......................... 386/52; 386/125

(58) Field of Search ................... 386/94, 95, 52, 386/125, 126, 46, 1, 4, 45; 360/13, 15; 369/30.5; 705/57; 380/201; H04N 5/85, 27/00

(56) References Cited

U.S. PATENT DOCUMENTS 5,537,592 A * 7/1996 King et al.

* cited by examiner

Primary Examiner—Robert Chevalier
(74) Attorney, Agent, or Firm—RatnerPrestia

(57) ABSTRACT

A method for copying data in disk recording media, and disk recording apparatus. At copying data recorded in a disk to another disk, occurrence of seek at the copy source is eliminated or suppressed below a specified value during reading data to reduce read time. At the target disk, data is rearranged according to video scenes or files, or file control information is rewritten to maintain the data structure of the copy source.

32 Claims, 15 Drawing Sheets

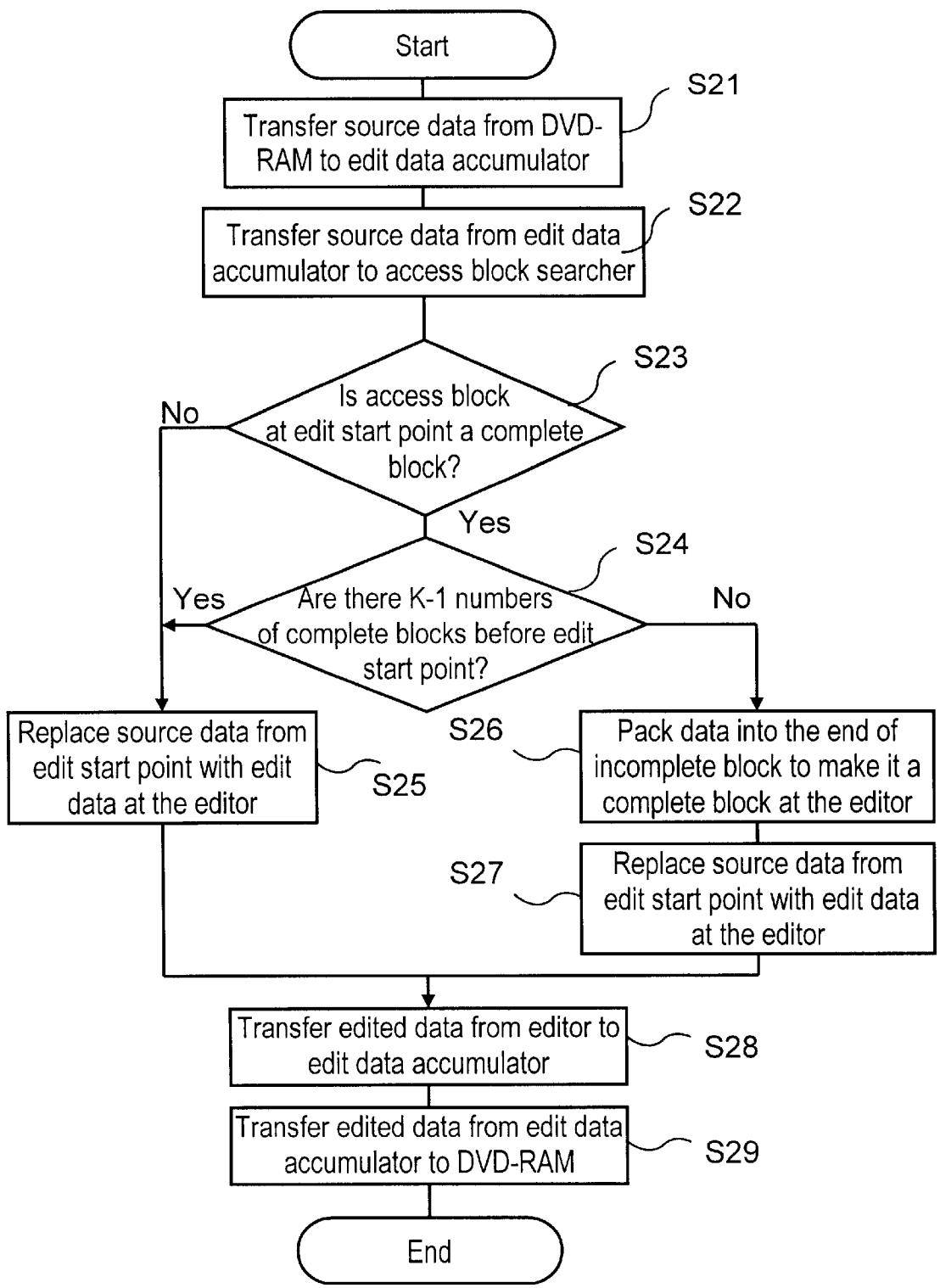

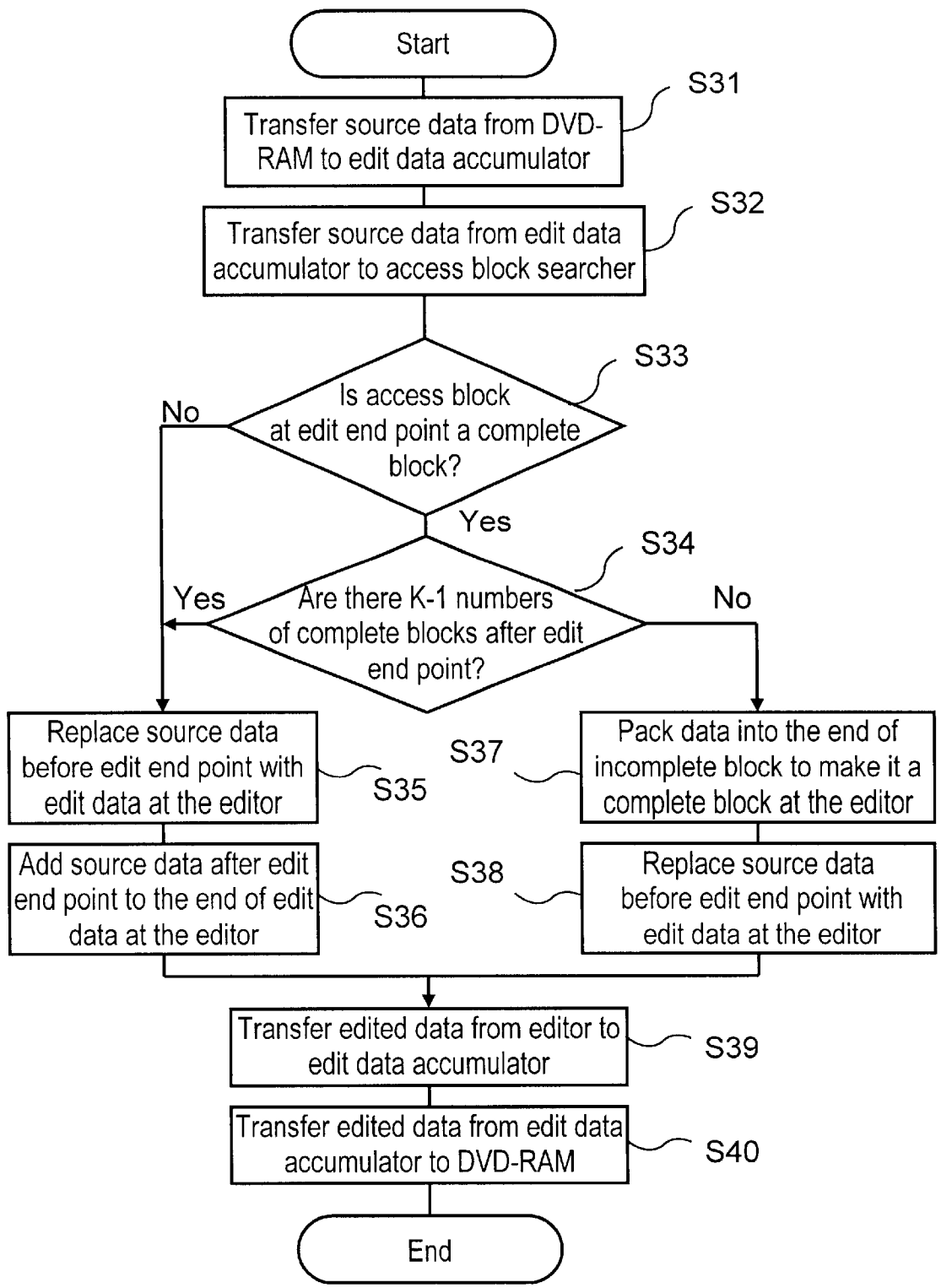

METHOD FOR COPYING, RECORDING, AND EDITING DATA ONTO DISK RECORDING MEDIA, AND DISK RECORDING APPARATUS

FIELD OF THE INVENTION

The present invention relates to the field of methods for copying data stored in disk recording media, and disk recording apparatuses, more particularly to data copying methods for disk recording and reproducing apparatuses using disk recording media in which tracks for recording data are divided into blocks (sectors) of a specified length; and disk recording apparatuses.

The present invention also relates to the field of methods for recording data onto disk recording media, more particularly to methods for recording data onto disk recording media that assure I/O bit rates during recording and playback.

The present invention further relates to the field of methods and apparatuses for editing data in disk recording media, more particularly to methods and apparatuses for editing data in which bit rates and real time processing are assured during AV data editing.

BACKGROUND OF THE INVENTION

In line with the recent emergence of large-capacity recording media such as magnetic disks, optical disks, magneto-optical disks, and DVDs (digital video disks), a large volume of data can be recorded and stored on a single recording medium. The need for copying operation frequently occurs to transfer all or a part of data stored in large-capacity recording media onto other recording media. In such copying operation, the following process is required: (1) data is read from a source disk, (2) the read data is transferred to a target disk, and (3) the transferred data is recorded onto the target disk.

When employing conventional data copying methods, however, reading is a time-consuming process due to increased seek time while reading data from the source disk if the data is not consecutive. 'Seeking' is the operation by which data is searched for by moving the optical pickup back and forth in the radial direction over the rotating disk to find data when data are not physically consecutive. Seeking occurs during editing when the length of data to be added or replaced is longer than that of the space left when old data is deleted or replaced, resulting in surplus data being recorded onto empty blocks. Larger number of seek operations leads to extended read time, resulting in lower data transfer rate and longer copying time. In particular, when copying all the data from a large-capacity disk recording medium such as a DVD, it takes considerable time.

The present invention aims to solve the conventional problems described above, and to provide methods for copying data in a disk recording medium and disk recording apparatuses which can reduce the time to copy.

In addition, the number of access blocks in the data regions of the recording medium not fully recorded may increase through editing operations, including transferring data recorded on large-capacity recording media to a different recording medium, copying data from other recording media, and transferring data between different files on the same recording medium, because of edit data of variable length. This results in larger number of seek operations and lower data transfer rate, as the recorded data are not read consecutively. FIGS. 1 to 4 illustrate data transfer, one process that takes place during data editing operations. FIG. 1 shows the copying of data from one data track to another data track. In FIG. 1, source data is recorded on a copy source data track 1, and the source data is incorporated into a copy target data track 2 by copying. Data recorded onto a group of specified access blocks in the copy source data track 1 is cut out (cut-out data 3), and incorporated into a specified region of the copy target data track 2 (target incorporation data region 4). Here, the data length of the cut-out data 3 is expressed as a and the length of data in the target incorporation data region (hereafter referred to as the incorporation region) 4 is expressed as b.

FIG. 2 illustrates data incorporation when the data length of the cut-out data 3 cut from the copy source data track I and the data length of the incorporation region 4 in the copy target data track 2 are the same, i.e., a=b.

In this case, since both data lengths are the same, copying is executed without any inconvenience.

FIG. 3 illustrates the case when the data length of the cut out data 3 cut from the copy source data track 1 is shorter than that of the incorporation region 4 in the copy target data track 2, i.e., a<b.

Since the incorporation data region 4 of the target disk is larger, copying takes place as usual and space 5 in the copy target data track 2 stays empty.

FIG. 4 illustrates the case of data incorporation when the length of the cut-out data 3 cut from the copy source data track 1 is longer than that of the incorporation region 4 in the copy target data track 2, i.e., a>b.

In this case, since the copy target incorporation region 4 is smaller, only partial data 3a, with a data length matching the incorporation region 4, out of the cut-out data 3 is first recorded onto the incorporation region 4 in the copy target data track 2. Then, the remaining partial data 3b of the cut-out data 3 which is not incorporated in the incorporation region 4 is split off and recorded onto a data region 7 in a copy target substitute track 6. The addresses of the incorporation region 4 and data region 7 are held by the data controller. This enables data to be reproduced without a break when a single unit of data is read out.

With the above conventional data recording apparatus for recording data onto a disk recording medium, however, next problems occur. When the length of cut-out data 3 cut from the copy source data track 1 is shorter than the data length of the incorporation region 4 in the copy target data track 2, copying takes place as usual; however, this results in an empty surplus region being left in the copy target data track 2. When the length of the cut-out data 3 is longer than the data length of the incorporation region 4 in the copy target data track 2, the remaining partial data 3b of the cut-out data 3 is recorded onto the data region 7 of the substitute track 6. Since the data controller holds the addresses of the incorporation region 4 and data region 7, split regions increase as a result of repeated data copying. This makes the control between data track 2 and substitute track 6 complicated, and results in a large number of seek operations being needed during data recording and playback, limiting the data transfer bit rate.

The present invention aims to solve the problems described above and to provide methods and apparatuses for copying data onto disk recording media which assure I/O bit rates during data recording and playback.

Also in editing operations such as copying data from a different recording medium, or transferring data between different files in the same recording medium, the number of access blocks not filled with data in the data region of the recording medium increases, since the edited data is variable data. The resulting increased number of seek operations due to the non-consecutive playback similarly reduces the data transfer bit rate. In addition, for AV data, the continuity of data transfer is interrupted, degrading real time processing.

The present invention aims to solve the conventional problems described above and to provide methods and apparatuses for editing data in disk recording media in which bit rates and real time processing are assured during data playback even if edit data is variable data.

SUMMARY OF THE INVENTION

A method for copying data onto a disk recording medium in the present invention is designed for disk recording and reproducing apparatuses which employ disk recording media whose data recording area is divided into blocks with a specified length. When copying data recorded on one disk to another disk, the method of the present invention reads data without or suppressing the occurrence of seek in a copy source below a specified value, and transfers it to a target disk, and the data structure of the copy source is maintained by rearranging each file or rewriting file control information at the target disk.

A method for copying data in a disk recording medium in the present invention comprises the steps of reading file control information of files recorded in a copy source disk; reading at least one part of data recorded in data region in the file consecutively, ignoring the file control information; accumulating read data in a memory; reading the file control information of a target copying disk; recording the data accumulated in the memory onto the copy target disk; and recording the file control information on recorded data onto the copy target disk.

The above configuration enables to minimize reading time, and in turn reduce the overall copying time by reading data without executing seek or suppressing the occurrence of seek below a specified value at a copy source.

A disk recording apparatus of the present invention is designed for employing a disk recording medium in which tracks for recording data are divided into blocks with a specified length. The disk recording apparatus of the present invention comprises disk drives for copy source and copy target disk, and a controller for controlling data read and transfer between these disk drives for the copy source disk and target copying disk. The controller controls reading data without causing seek or suppressing the occurrence of seek below a specified value, transferring the data to the target copying disk, and maintaining the data structure of the copy source by rearranging each file or rewriting file control information at the target copying disk. The above control enables to minimize reading time, and in turn reduce the overall copying time by reading data without generating seek or suppressing the occurrence of seek below a specified value at the copy source.

The method for copying data in disk recording media in the present invention divides data area of the disk recording medium into plural consecutive access blocks with a specified length, records data onto each access block, predetermine the access block length for consecutively writing data and the number of access blocks (K–1) on which data is sufficiently recorded, and sufficiently record AV data onto that number of consecutive access blocks.

The disk recording apparatus of the present invention comprises a memory for storing image data, recorder for recording data onto an external recording medium, and a memory controller for editing data stored in the memory and then transferring it to the recorder. The memory controller comprises an edit data accumulator for storing edit data, access block searcher for searching an access block of data stored in the edit data accumulator, editor for recording data by each access block, and edit controller for determining the access block length for consecutively writing data and the number of access blocks (K–1) onto which data is sufficiently recorded in the access blocks and controlling access block search operation and data edit operation. The above configuration enables to suppress the occurrence of seek, and achieves real time processing during data recording and playback.

The data editing method for disk recording media in the present invention divides data area of the disk recording medium into plural consecutive access blocks with a specified block length; and predetermines the access block length for consecutively writing data and the number of access blocks (K–1) which is filled with data. During data editing, the presence of K–1 number of access blocks previously filled with data is confirmed first before starting editing of the source data. If such access blocks exist, data editing starts from that edit start point. If not, data is packed to the end of the access block not filled with data. Then, data editing starts from the edit start point. The above data editing method assures that K–1 access blocks before the edit start point is at least filled with data, securing consecutive playback during reproduction. Accordingly, the bit rate and real time performance are assured.

BRIEF DESCRIPTION OF THE DRAWINGS

FIG. 16 is a flow chart illustrating data editing in accordance with a third exemplary embodiment of the present invention.

FIG. 17 is a flow chart illustrating data editing in accordance with a fourth exemplary embodiment of the present invention.

DESCRIPTION OF THE PREFERRED EMBODIMENT

First Exemplary Embodiment

A method for copying data in disk recording media and disk recording apparatus in a first exemplary embodiment are described with reference to drawings.

Figure 5:
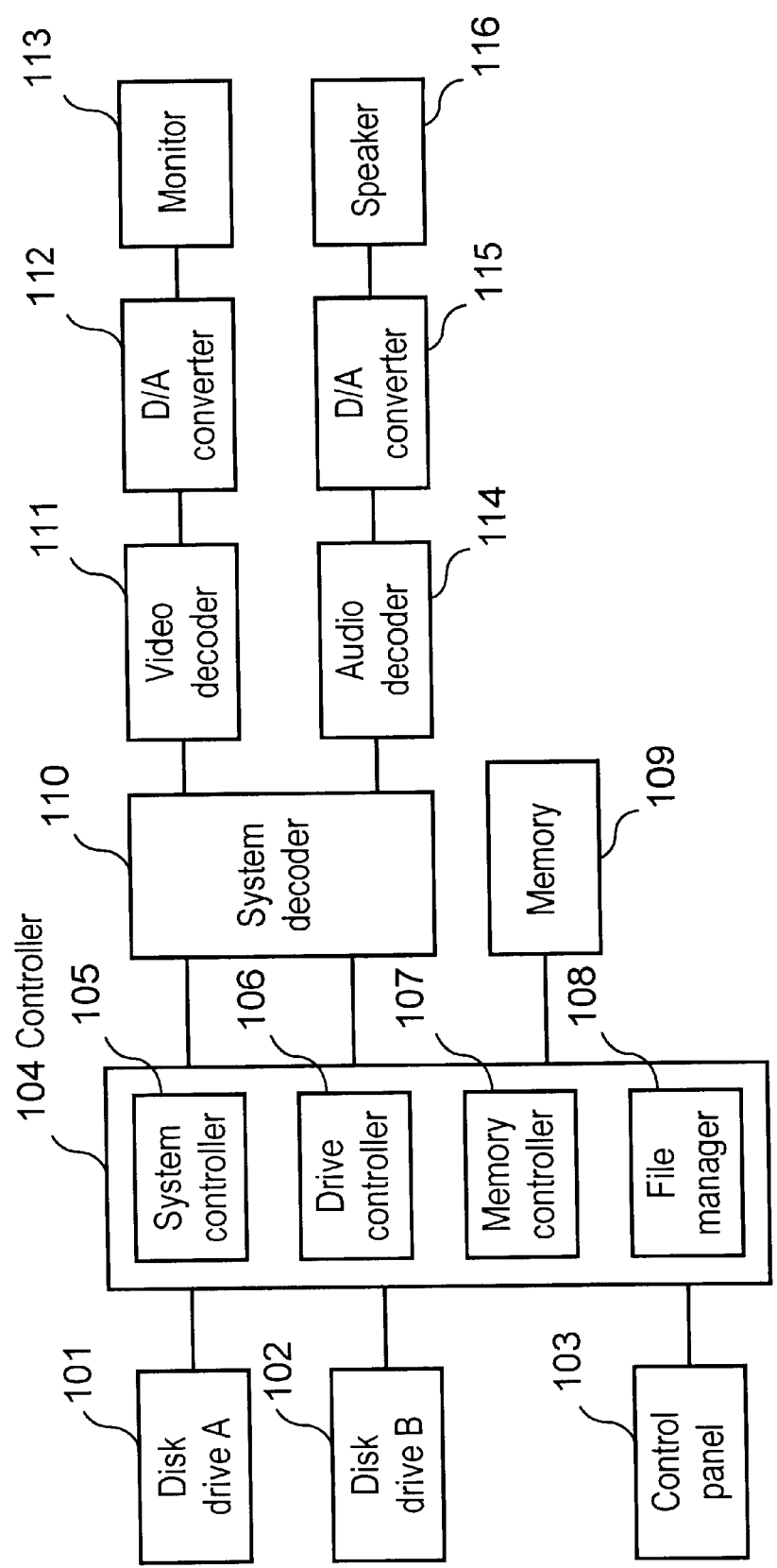
FIG. 5 is a block diagram illustrating a brief configuration of a disk recording and reproducing apparatus applying a data copying method in accordance with a first exemplary embodiment of the present invention.

FIG. 5 shows the configuration of a disk recording and reproducing apparatus in accordance with the first exemplary embodiment. In FIG. 5, both first disk drive A101 and second disk drive B102 read from and write onto a disk recording medium, and are connected to a controller 104. A control panel 103 receives instructions such as for copying by user input, and outputs them to the controller 104. The controller 104 includes a CPU, and comprises a system controller 105 for controlling the entire apparatus, a drive controller 106 for controlling the disk drives 101 and 102; a memory controller 107 for controlling a memory; and a file manager 108 for managing video scenes or file contents recorded on the disk. A memory 109 is connected to the controller 104, and data is temporarily stored here during copying. A system decoder 110 is connected to the controller 104, and separates encoded data read from the disk into video signals and audio signals. A video decoder 111 decodes the separated encoded video signals. A D/A converter 112 converts decoded video signals into analog signals. A monitor 113 such as a liquid crystal display monitor displays analog video signals as visible images. An audio decoder 114 decodes encoded audio signals. A D/A converter 115 converts decoded audio signals into analog signals. A speaker 116 outputs analog audio signals as listenable audio.

Figure 6:
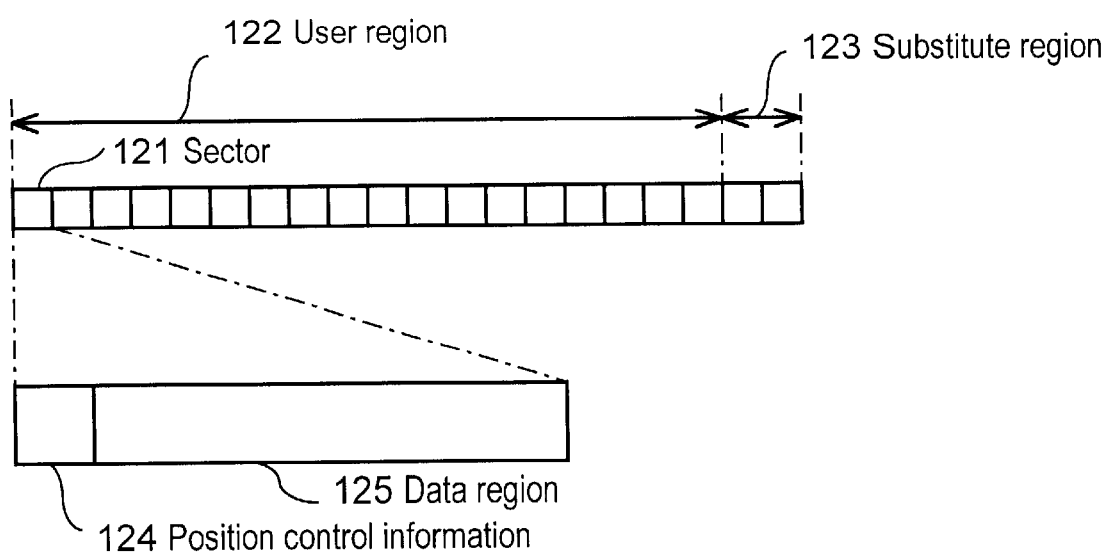
FIG. 6 is a schematic view of a data structure on a disk in accordance with the first exemplary embodiment of the present invention.

Next, the data structure of a disk in the disk recording and reproducing apparatus as configured above is described. As shown in FIG. 6, a track formed spirally or concentrically comprises multiple blocks of fixed length called sectors 121. Areas in these blocks which the user can use are an user region 122 and substitute region 123. Data is recorded on the user region 122. The substitute region 123 is an area which substitutes for the user region 122 if there is a defect in a part of the sector 121 in the user region 122 on which data cannot be recorded. Each sector 121 is partitioned into position control information 124, which indicates the number of each sector, and a data region 125, onto which data is actually recorded. Unlike in FIG. 6, in some cases, the data region 125 is at the front of the position control information 124. In addition, in the case of video signals, a supplementary information region may be provided to store the recording date and time.

Figure 7:
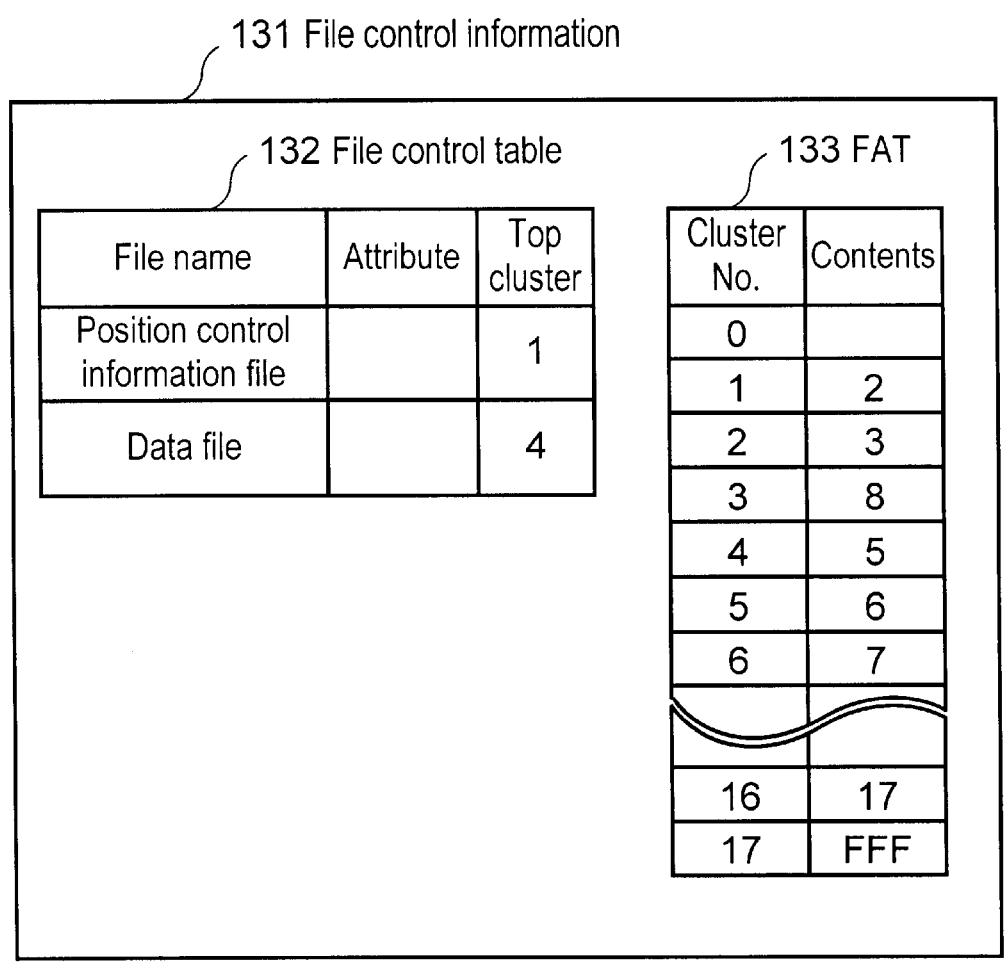
FIG. 7 is a schematic view of file control information in accordance with the first exemplary embodiment of the present invention.

A file is made up of such sectors in which data is recorded. One known method for controlling sector connecting sequences which constitute files is the FAT (File Allocation Table) employed in PC Operation System (OS). In the FAT, for example as shown in FIG. 7, file control information 131 is made up of a file control table 132 and FAT 133. The file control information 131 is recorded at the top sector of the file. A file name and its top cluster (sector) are recorded in the file control table 132, and space for a cluster number (sector number) and a column for information on onto which the cluster is connected is provided in the FAT 133.

When reading out file data in a disk, the file control table 132 of the file control information 131 is searched to confirm the presence of a target file to access. If the file exists, its FAT 133 is read out. The FAT 133 provides information on the links between clusters making up the file or space information. Then, the content of the file recorded in the data region 125 is read out in the sequence designated by the FAT 133. When copying the file data onto a disk, space information confirming that the designated file is recordable is provided from the FAT 133. The data is then recorded sequentially onto empty regions, and at the same time, the linking of data fragments is recorded onto the FAT 133. Furthermore, the recorded file name, attributes, and top cluster are recorded in the file control table 132. With the file control information 131, the consecutive nature of the data can be assured, and data recorded onto different places on the disk can be reproduced as one contiguous stream of data.

Figure 8:
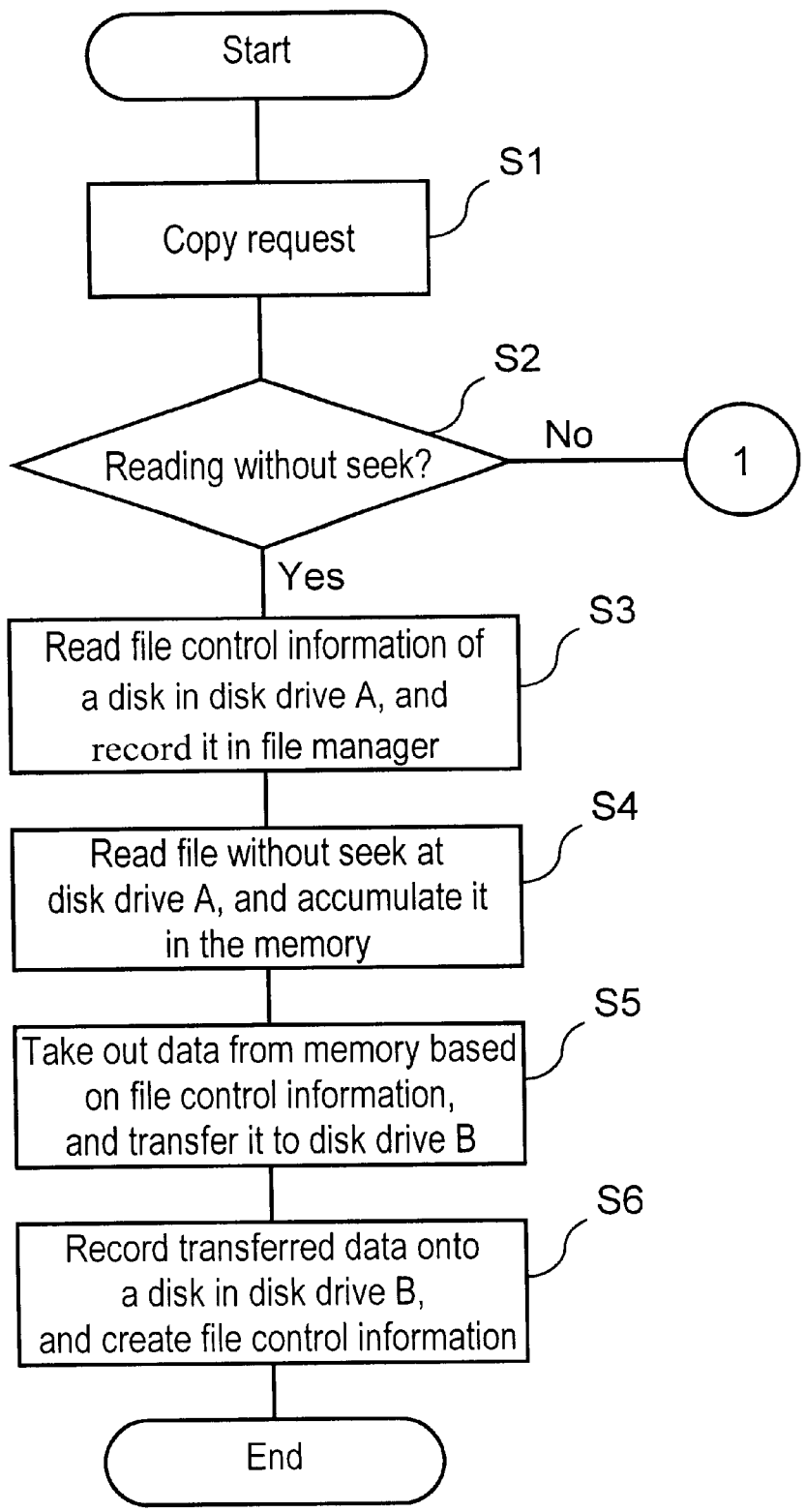
FIG. 8 is a flow chart illustrating the reading without seek in accordance with the first exemplary embodiment of the present invention.

Next, the copying operation in the above disk recording and reproducing apparatus is described with reference to FIGS. 5, 8, and 9. First, the user selects reading with or without seek, and enters it using the control panel 103. When receiving a copying request from the control panel 103 (Step S1), the controller 104 determines whether the request is reading with or without seek (Step S2). In case of reading without seek, the disk drive A101 plays back a disk, reads the file control information of a file to be copied, and records it temporarily in the file manager 108 (Step S3). Then, the disk drive A101 accumulates data in the memory 109, ignoring the file control information of the file, which means reading without seek (Step S4). Then, the controller 104 takes out the data sequentially from the memory 109 based on the file control information recorded in the file manager 108, and transfers it to the disk drive B102 (Step S5). The disk drive B102 records the transferred data in the order dictated by the file control information, and the controller 104 writes its connection sequence to the FAT of the file control information (Step S6).

When reading without seek at the copy source, as described above, high-speed reading and high-speed transfer are made possible. By correctly arranging data during recording onto a target disk, all pieces of data are physically and logically consecutive on the target disk, assuring data reproducibility.

Figure 9:
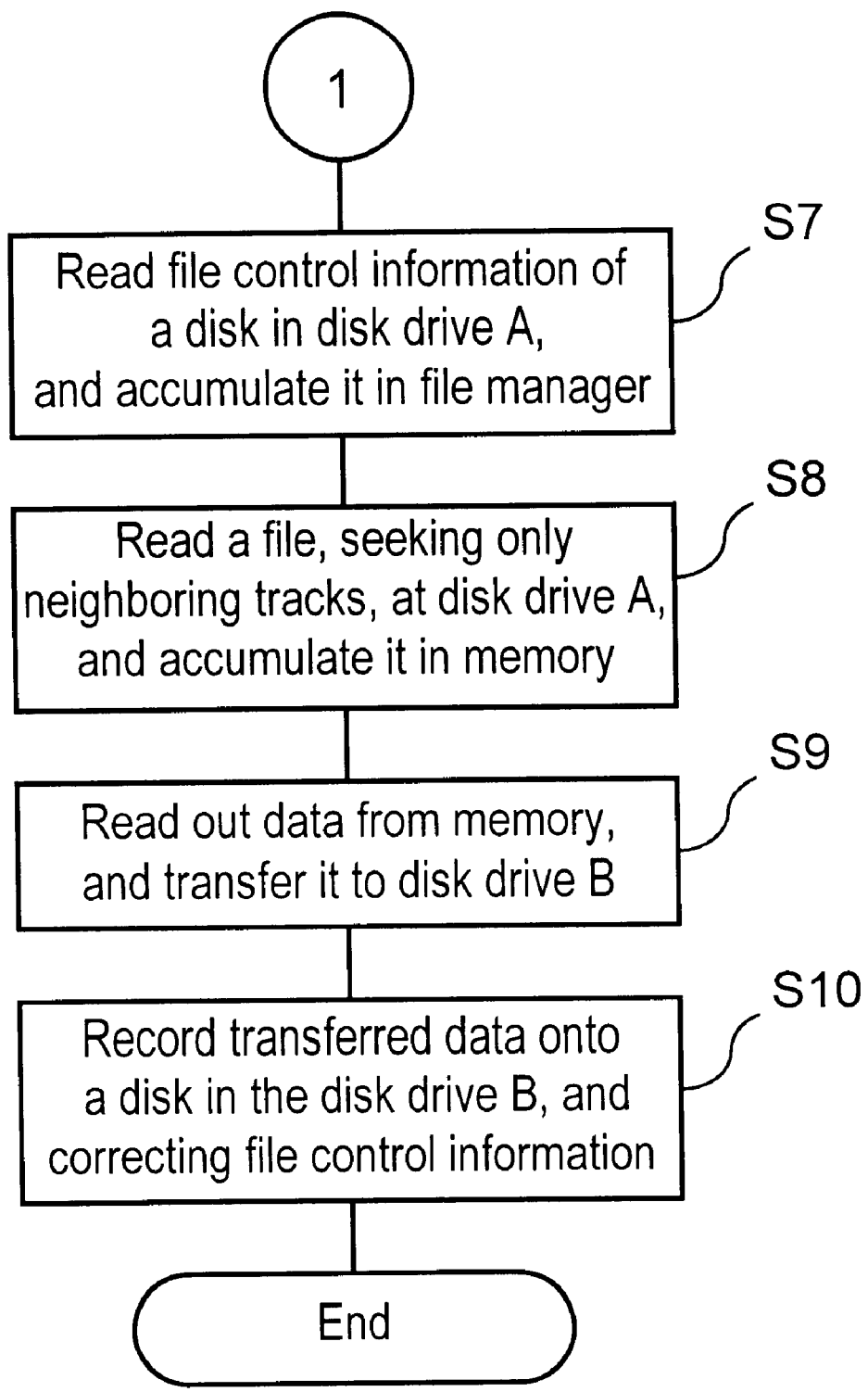
FIG. 9 is a flow chart illustrating the reading with seek in accordance with the first exemplary embodiment of the present invention.

In case of reading with seek in Step S2, as shown in FIG. 9, the disk is played back by the disk drive A101 to read the file control information of the file to be copied, and it is recorded temporarily onto the file manager 108 (Step S7). Next, referring to the file control information, the disk drive A101 reads the file, executing seek only for neighboring tracks. Other than neighboring tracks, all tracks are read consecutively, and the data is accumulated in the memory 109 (Step S8). Next, the read data is sequentially read out from the memory 109, and then transferred to the disk drive B102 (Step S9). The disk drive B102 consecutively records the transferred data, and the controller 104 writes a new connection sequence after seek into the FAT of the file control information. At the same time, seek information extending over two or more tracks is searched in the file control information and then added to the FAT for correcting the file control information (Step S10). FIG. 9 omits the flow for reading all tracks consecutively, except for neighboring tracks, for reasons of simplification.

One example of a method for determining the need for seek based on the file control information is described next. The FAT 133 in FIG. 7 shows a case where Cluster No. (Sector No.) starts from 1 to 2, and then consecutively from 2 to 3, but jumps from 3 to 8. If Cluster Nos. are skipped and not consecutive, there is possibility that seek will take place. The need for and number of seeks can be determined from the degree of separation of the two cluster numbers. Accordingly, the presence of seek and an extent of seek can be determined based on file control information. In other words, whether seeking is for neighboring tracks, degree of closeness of neighboring tracks, or degree of separation of tracks can be determined. If judgment criteria are set for the degree of two separated cluster numbers, it can be judged as neighboring seek if the value is below a specified level. Or, it can be used for triggering seek if the value is above the specified level, and for canceling seek operation if it is below the specified level.

Accordingly, data can be read from the copy source without seek or by suppressing the occurrence of seek to below the specified level to minimize the occurrence of seek by obtaining information on actual occurrence of seek from the file control information before seek actually occurs frequently.

Furthermore, if seek actually occurs, the number of seeks can be counted so as to stop seeking after reaching a specified number of times, and the instruction can be issued to switch to consecutive reading.

Thus, reading time and transfer time can be reduced by performing seek only for neighboring tracks at the copy source. Continuity of data at playback can be secured by modifying the file control information at the target disk based on changes in connecting sequence.

In this exemplary embodiment, the user selects whether seek should take place or not. However, the system may be designed to make the apparatus itself adaptatively determine either of these options based on factors such as transfer capacity and reading and transfer time. For example, if data equivalent to one DVD disk is copied, processing can be sped up by reading data without seek and rearranging the data afterwards. Thus it can be made to select the no seek mode if the user requests disk copy. Even when only a few files in the disk are copied, the no seek mode may be selected if information on the number of seeks required, obtained from reading the file control information, is above a certain number.

The first exemplary embodiment describes a case when two disk drives are installed in one disk recording and reproducing apparatus. The exemplary embodiment is also applicable to a case where a disk recording and reproducing apparatus is installed with one disk drive, and data copying is implemented among different disk recording and reproducing apparatuses.

As described above in the first exemplary embodiment, the present invention reduces read time by reading data from the copy source without executing seek or suppressing occurrence of seek below a specified value while copying data recorded on one disk to another disk. The data structure of the copy source is maintained by rearranging the data according to video scenes or files, and rewriting file control information at the copy target disk. This makes it possible to secure a preferable data transfer rate, thus reducing overall copying time.

The expression "maintain the data structure of the copy source" in the present invention means to maintain a logical data structure, and not necessarily a physical data structure.

Second Exemplary Embodiment

A method and apparatus for recording data onto a disk recording media in a second exemplary embodiment of the present invention is described with reference to drawings.

Figure 10:
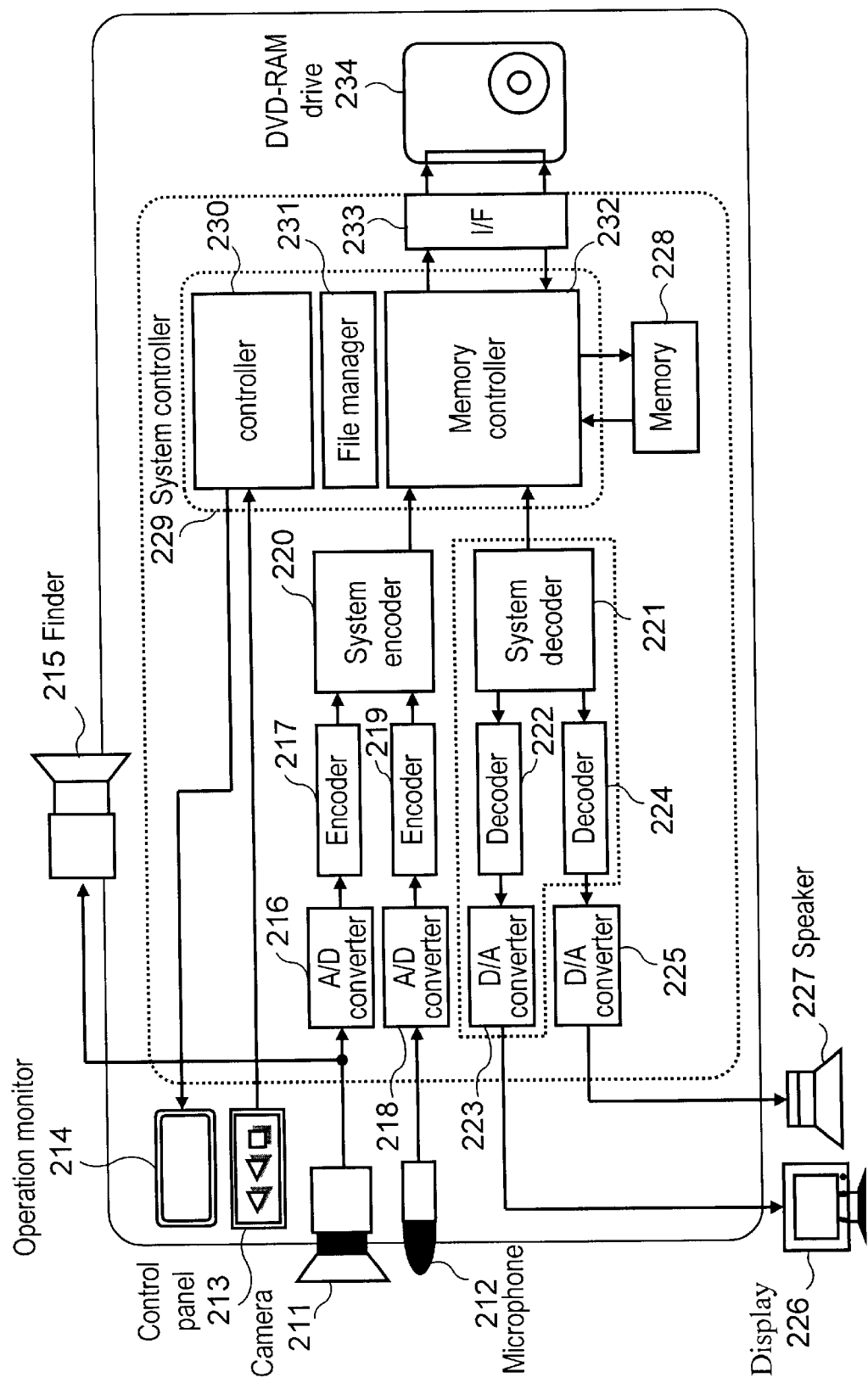
FIG. 10 is a block diagram of a configuration of a recording camera applying a method for recording data onto a disk recording medium in accordance with a second exemplary embodiment of the present invention.

In FIG. 10, output signals from a recording camera 211 (hereafter referred to as "camera") to which video images are input and a microphone 212 to which audio is input are send to a system encoder 220 respectively through A/D converters 216 and 218, and encoders 217 and 219. A range of operations are input to the camera 211 using a control panel 213. An operation monitor 214 displays the contents of operation given through the control panel 213. The control panel 213 and operation monitor 214 are connected to a controller 230. A finder 215 determines a visual field at operating the camera 211, and it also functions as a monitor for displaying signals recorded by the camera 211. The system encoder 220 synthesizes or combines encoded video and audio data.

A system decoder 221 separates synthesized or combined encoded video and audio data. Separated video and audio data are sent to a display 226 and speaker 227 respectively through decoders 222 and 224 and D/A converters 223 and 225.

A system controller 229 receives signals from each functional unit, and gives instruction to each functional unit according to each operation and movement in order to control the entire operation of the apparatus. The system controller 229 comprises a data processing unit consisted of CPU and hardware; and a controller 230, file manager 231, and memory controller 232 are built in. The controller 230 controls each operation including system control, drive control and LSI control. The file manager 231 manages files stored in the memory 228. The memory controller 232 controls writing to and reading from the memory 228. The memory controller 232 is connected to an interface 233, and a DVD-RAM drive 234 is connected to this interface 233. A SCSI interface is used for the interface 233. Through this interface 233, sending and receiving data for copying and transferring data between the DVD-RAM drive 234, memory controller 232, and memory 228 are executed. A large capacitance memory medium such as DVD-RAM (rewritable DVD) is set to the DVD-RAM drive 234 as an external recording medium for recording and reproducing data.

Figure 11:
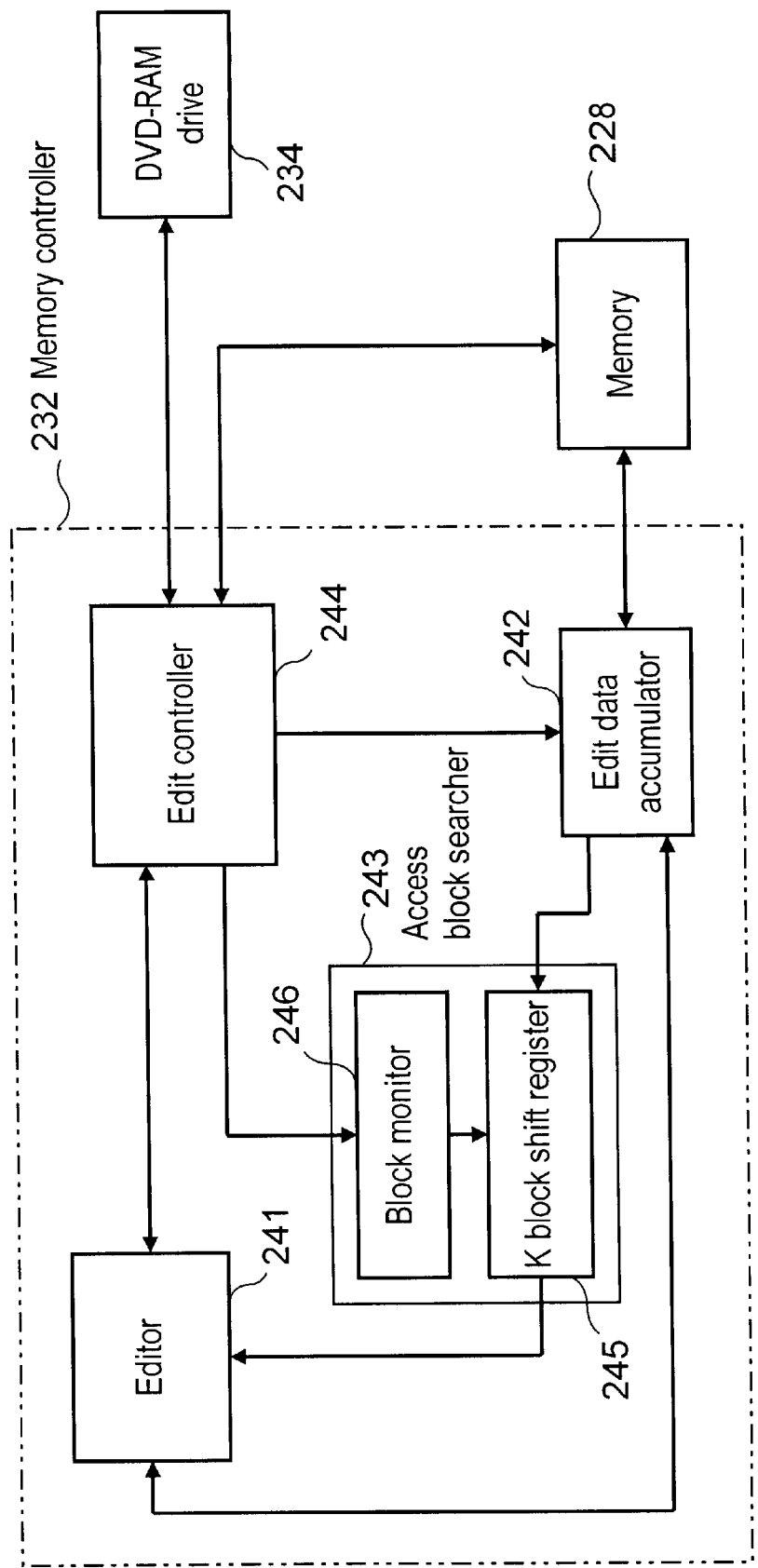
FIG. 11 is a block diagram of a configuration of a data recording apparatus for controlling the operation for executing the recording method in accordance with the second exemplary embodiment.

Configuration mainly of the memory controller 232 and each functional unit conducting related operations for controlling recording of data onto the disk recording media in the disk apparatus as configured above is described. In FIG. 11, the memory 228 is connected to the memory controller 232. The memory controller 232 includes an editor 241 for editing video and other data, edit data accumulator 242 for temporarily storing edited or to be edited data, access block searcher 243 for searching access block of data stored in the edit data accumulator 242, and edit controller 244 for controlling editing and access block searching operations. The apparatus for recording and reproducing data onto disk recording media in this exemplary embodiment is thus configured by aforementioned memory 228, memory controller 232, DVD-RAM drive 234, editor 241, edit data accumulator 242, access block searcher 243, and edit controller 244.

In this exemplary embodiment, the access block length for consecutively writing data such as AV data, and the number of access blocks in which data is fully recorded out of K numbers of access blocks, i.e., the number of access blocks (K−1) in which data is consecutively recorded without any space, is determined. Recording, editing for playback, and copying are implemented using an algorithm satisfying the pre-determined K−1 number for assuring the bit rate in data editing.

The access block searcher 243 comprises a K block shift register 245 and block monitor 246. The K block shift register 245 has the capacity to store data in K numbers of access blocks, and shifts data read out from the edit data accumulator 242 for each access block. The block monitor 246 monitors the presence of two or more access block not sufficiently filled with data, i.e., unoccupied access blocks, in K numbers of access blocks held in the K block shift register 245.

Figure 12:
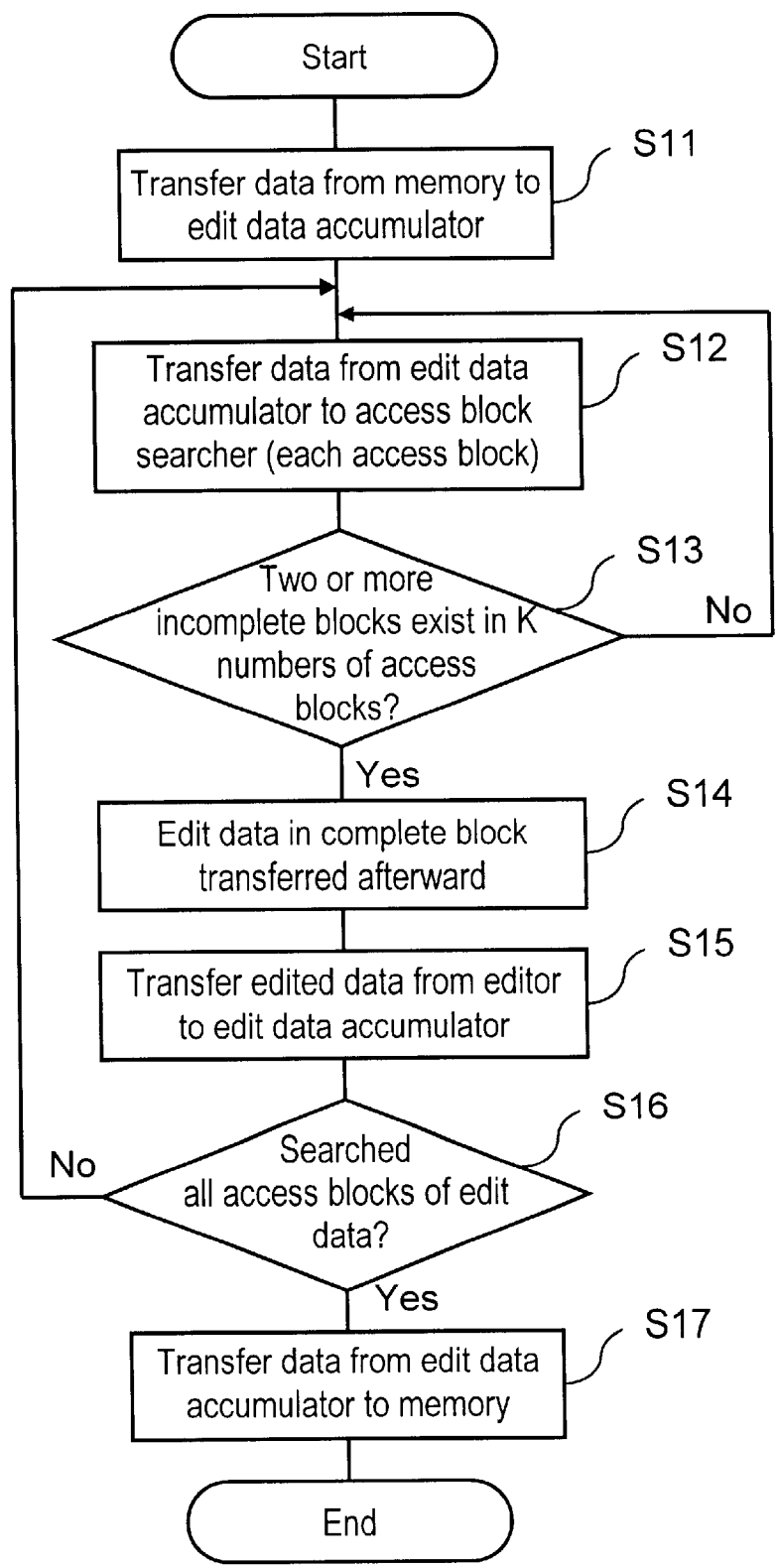
FIG. 12 is a flow chart illustrating editing onto a disk recording medium by data recording and reproducing apparatus in accordance with the second exemplary embodiment.

Next, operations of the data recording and reproducing apparatus to disk recording media in the second exemplary embodiment is described. An example of the editing operation to incorporate source AV data recorded on DVD-RAM into another AV data stored in the memory 228 is described. FIG. 12 is a flow chart illustrating the editing operation on a disk recording media by the data recording and reproducing apparatus in this exemplary embodiment. When data editing starts, the edit controller 244 transfers data incorporating the above AV data stored in the memory 228 (edit data) in the processing step (hereafter simply referred to as "step") S11 to the edit data accumulator 242. Next, the edit controller 244 reads out the edit data from the edit data accumulator 242 for each access block in Step S12, and transfers it to the access block searcher 243. The access block of the edit data is transferred to the K block shift register 245 of the access block searcher 243 and held there.

The edit controller 244 then starts the block monitor 246 in Step S13. The block monitor 246 checks K numbers of access blocks held in the K block shift register 245, and searches whether AV data is sufficiently recorded onto the access block without any remaining space (hereafter refereed to as "complete block") or AV data is not fully recorded onto the access block (hereafter referred to as "incomplete block"). In this way, the presence of two or more incomplete blocks in the K numbers of access blocks is checked.

After this checking operation, if there is no two or more incomplete blocks in the K numbers of access blocks, the operation returns to Step S12 to read out the next access block in the edit data from the edit data accumulator 242 and the edit data is transferred to the access block searcher 243.

If there are two or more incomplete blocks in the K numbers of access blocks in the above checking operation, access blocks after the second incomplete block transferred to the access block searcher 243 are transferred to the editor 241 to edit data to change the incomplete block to complete block, i.e., rewriting, is executed in Step S14. After rewriting the data, the edit controller 244 transfers edited data from the editor 241 to edit data accumulator 242 in Step S15. The edit controller 244 further checks whether searching of all access blocks of edit data is completed in Step S16. If the edit controller 244 determines that searching of all access blocks is not yet completed, in this checking operation, the process returns to Step 512 to read out the next access block of the edit data from edit data accumulator 242, and the edit data is transferred to the access block searcher 243. If searching of all access blocks in the checking operation in Step S16 is completed, the edit data is transferred from the edit data accumulator 242 to the memory 228 in Step S17, and a series of editing operation is completed.

This is how access blocks of edited AV data are searched. In the above example, the presence of two or more incomplete blocks in K numbers of access blocks is checked by shifting each access block. If there are two incomplete blocks, data of one incomplete block (incomplete block incorporated later in the above example) is rewritten to make it a complete block. Thus consecutive K−1 numbers out of K numbers of access blocks are ensured to be complete blocks.

Figure 13:
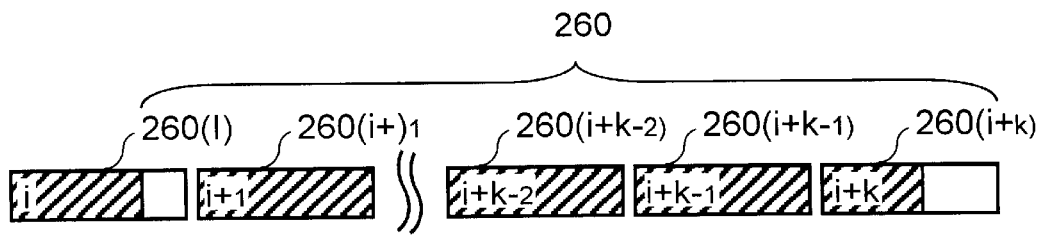
FIG. 13 is a schematic illustration of consecutive access blocks of AV data created by the operation in accordance with the second exemplary embodiment.

FIG. 13 is a schematic view illustrating the continuity of AV data access blocks achieved through rewriting of incomplete blocks as mentioned above. As shown in FIG. 13, let's say access block 260 (i) out of access blocks 260 (i), 260 (i+1), 260 (i+2) . . . , 260(i+k) is an incomplete block. With the above editing operation, at least (K−1) numbers up to 260 (i+1), 260 (i+2), . . . to 260 (i +k−1) are assured to be complete blocks. Even an incomplete block appears next, it may always be directly close to the access block 260 (i+k). Appropriate copying, transfer, and incorporation of AV data are thus implemented through the above data editing.

Figure 1:
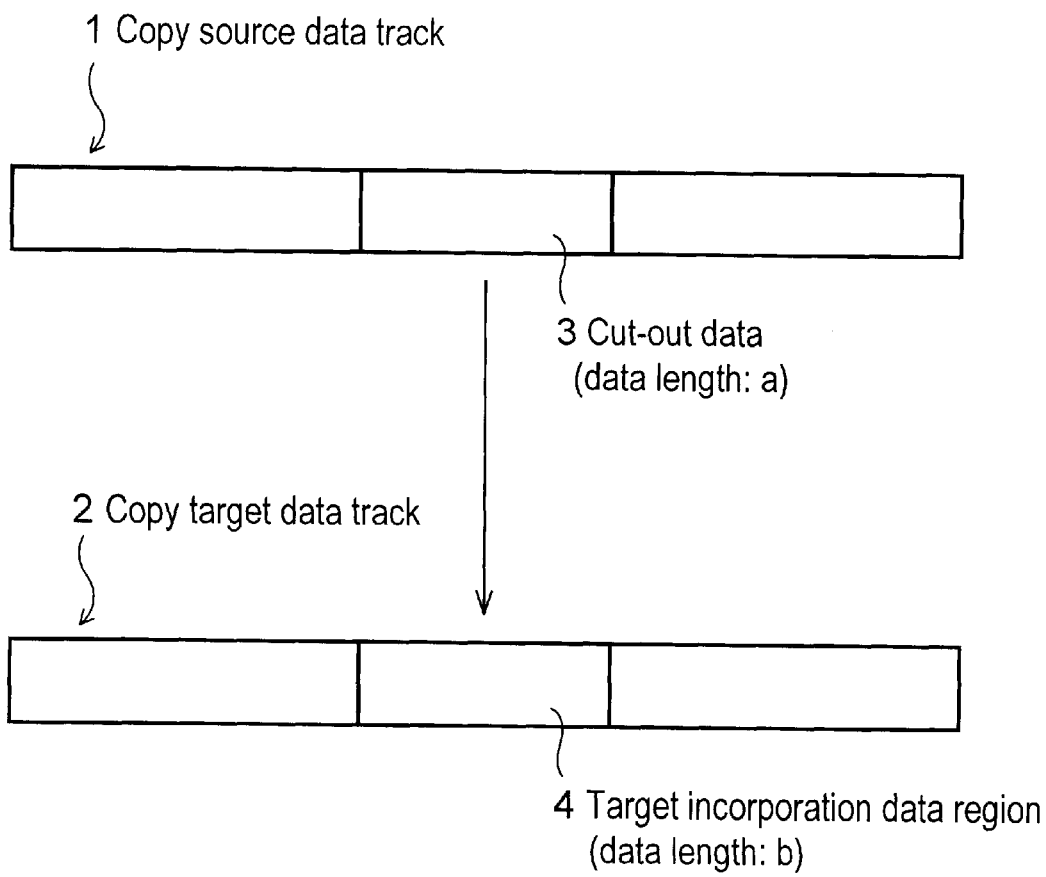
FIG. 1 is a general example of copying data from one data track to another data track in conventional recording of data onto a disk recording medium.
Figure 2:
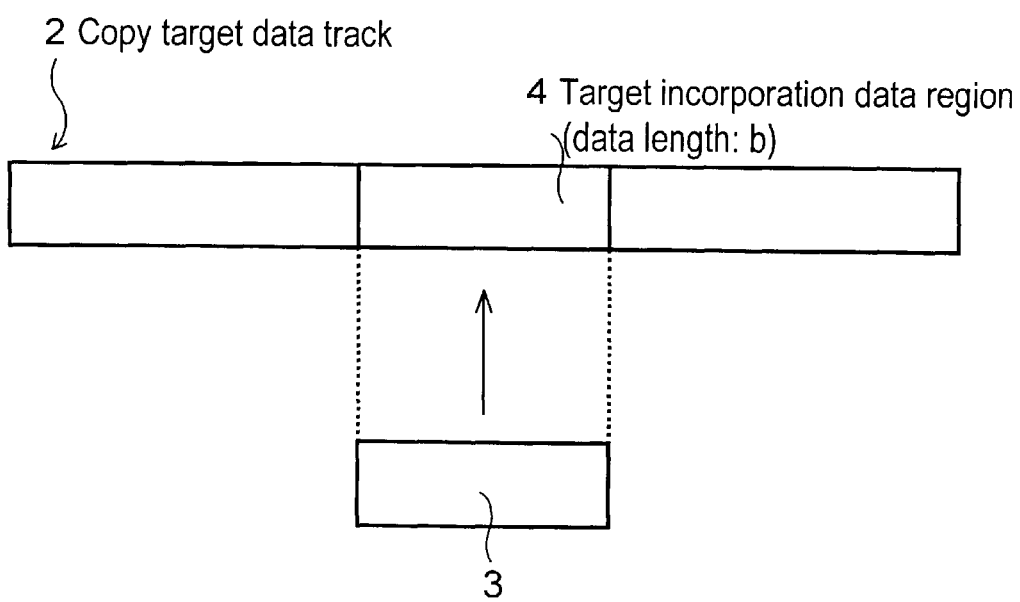
FIG. 2 is a general example of data incorporation in recording of data onto the disk recording medium when the length of cut-out data cut from a copy source data track and the length of data in a data incorporation region of a copy target data track are the same.
Figure 3:
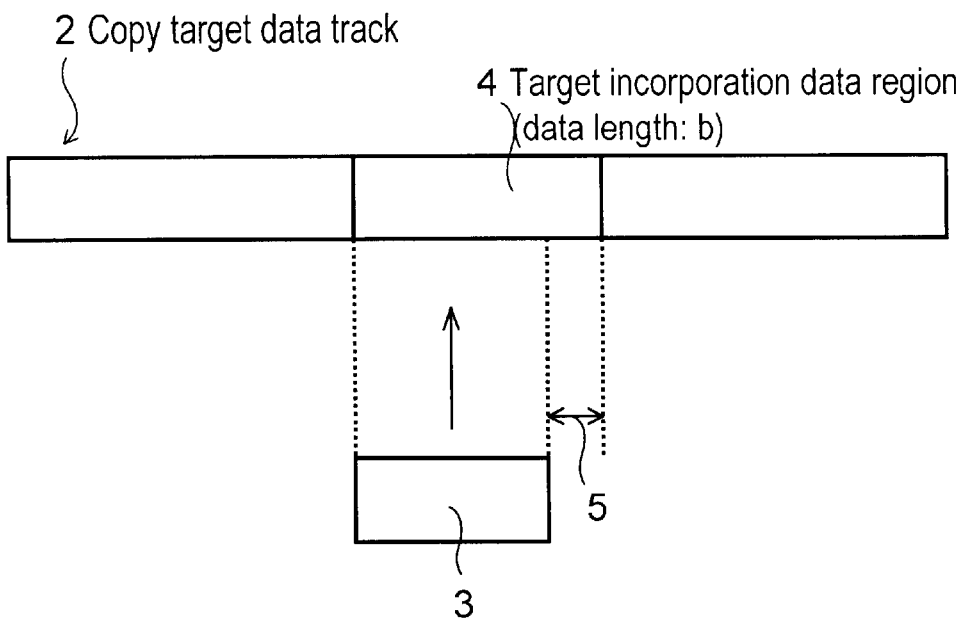
FIG. 3 is a general example of data incorporation in recording of data onto disk recording medium when the length of cut-out data cut from a copy source data track is shorter than the length of data in a data incorporation region of a copy target data track.
Figure 4:
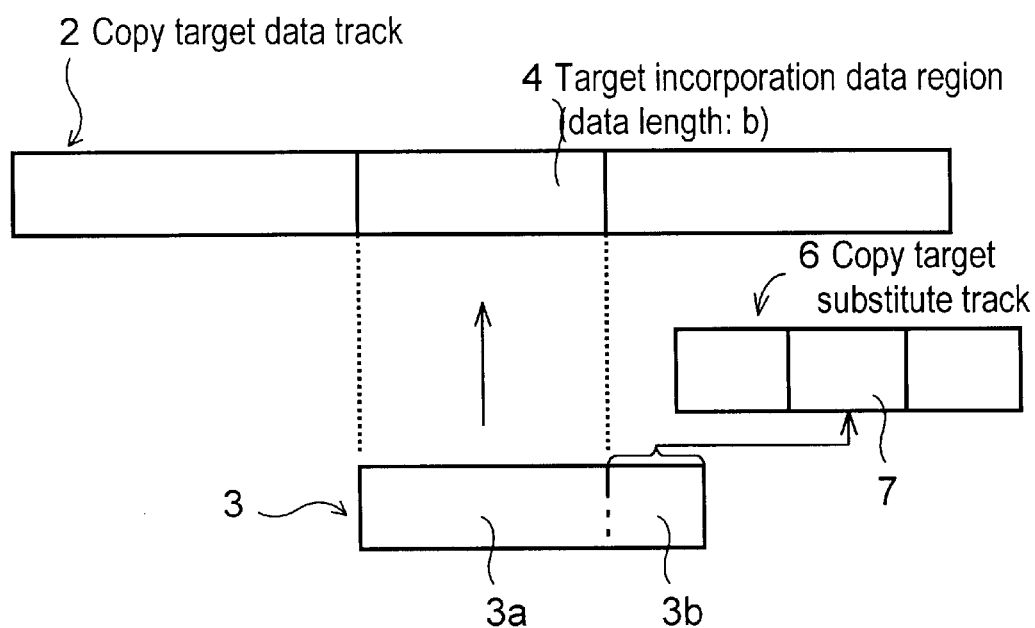
FIG. 4 is a general example of data incorporation in conventional recording of data onto disk recording medium when the length of cut-out data cut from a copy source data track is longer than the length of data in a data incorporation region of a copy target data track.
Figure 14A:
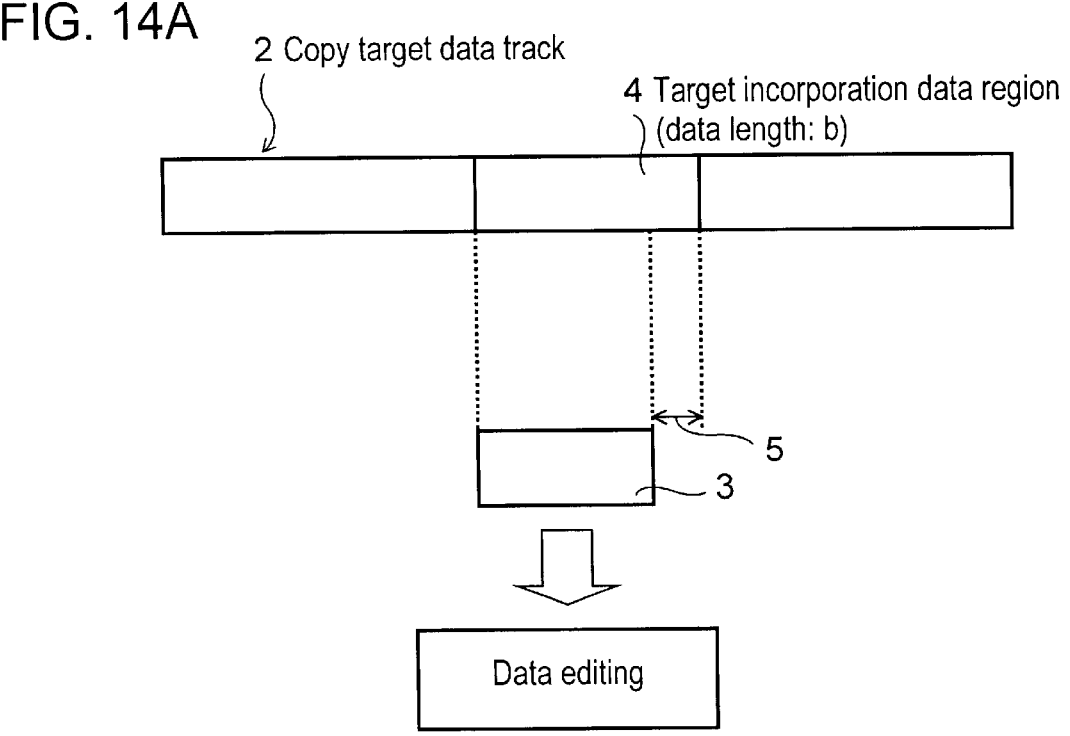
FIG. 14A is a schematic illustration of the state of occurrence of empty region in a copy target data track when the length of cut-out data cut from a copy source data track is shorter than the data length of an incorporation region in the copy target data track in the data copying operation in accordance with the second exemplary embodiment.
Figure 14B:
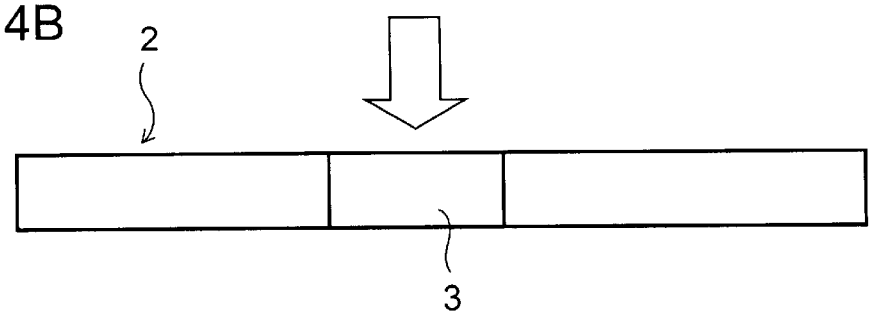
FIG. 14B is a schematic illustration of the state of writing data into empty region generated in the copy target data track for recording AV data consecutively.

FIGS. 14A and 14B illustrates data incorporation applying the present invention when the length of the cut-out data 3 cut from the copy source data track (reference numeral 1 in on and after FIG. 1) is smaller than the data length of the incorporation region 4 in the copy target data track 2. In this case, since the incorporation region 4 of the target track is larger and the space remains in the copy target data track 2 as shown in FIG. 14A, a space region 5 is created if data copying is executed. By applying the present invention, however, incomplete blocks (ex. 260 (i), 260 (i+k)) are rewritten during data editing to turn them into complete blocks. Thus, as shown in FIG. 14B, AV data in the copy target track 2 is recorded in the complete consecutive state.

Figure 15A:
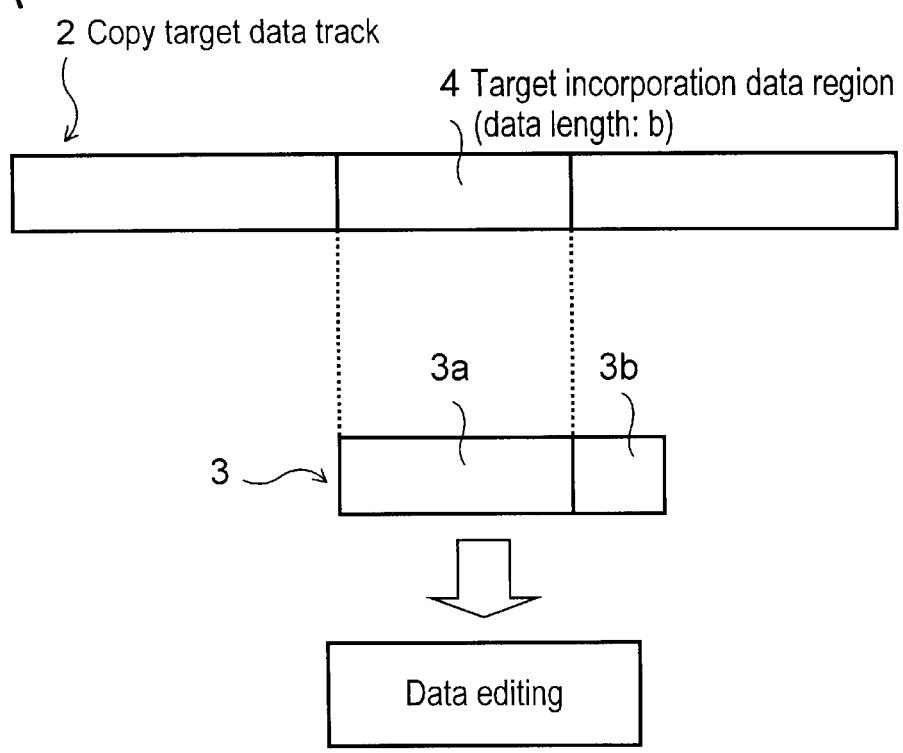
FIG. 15A is a schematic view of the state when remaining cut-out data which is not incorporated in the incorporation region occurs when the length of cut-out data cut from a copy source data track is longer than the data length of an incorporation region in the copy target data track in the data copying operation in accordance with the second exemplary embodiment.
Figure 15B:
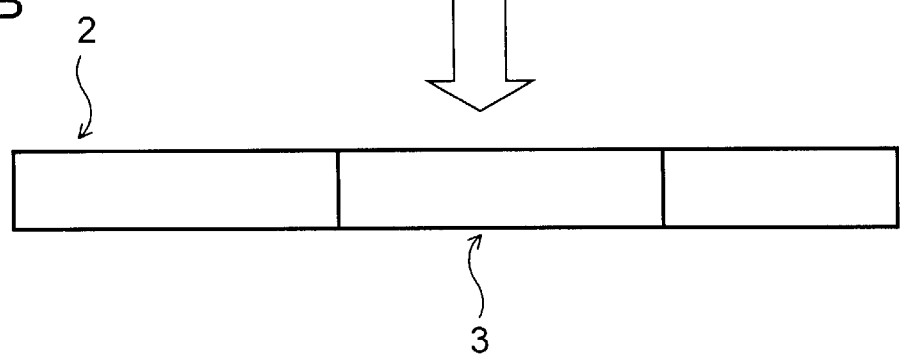
FIG. 15B is a schematic view illustrating the state of incorporation of the reading cut-out data generated in recording AV data.

FIGS. 15A and 15B illustrate data incorporation applying the present invention when the length of cut-out data 3 cut from the copy source data track 1 (FIG. 1) is larger than the data length of the incorporation region 4 in the copy target data track 2. Since the incorporation region 4 in the copy target track 2 is smaller, partial data 3a equivalent to the length of the incorporation region 4 out of the cut-out data 3 is recorded onto the incorporation region 4 in data copying. As shown in FIG. 15A, this causes remaining 3b of the cut-out data 3 not incorporated in the incorporation region 4. By applying the present invention, incomplete blocks (260 (i), 26 (i+k), etc.) in the entire AV data are rewritten during data editing to change them into complete blocks. This generates recording region in the copy target data track 2 sufficient for absorbing the remaining 3b. Cut-out AV data is thus completely recorded, as shown in FIG. 15B, without using the substitute track.

Accordingly, the present invention enables to sufficiently record AV data onto predetermined numbers of consecutive access blocks. The frequency of emergence of incomplete blocks can be suppressed below a specified level even data is read out only for each access block during recording and playback. Thus the bit rate during data recording and playback is assured. It should be noted that the above mentioned K value may be predetermined as required. The length of access block may also be specified as required (ex. 10 bytes, 20 bytes).

As it is apparent from in the second exemplary embodiment of the present invention, as a method for recording data onto a disk recording medium, data is recorded in each access block, and the length of consecutive access blocks to write in data and (K−1) number of consecutive access blocks fully recorded in all access blocks are predetermined. AV data is assured to be full recorded in these consecutive access blocks. Thus, at least K−1 number of consecutive access blocks are fully recorded with data and seeking is prevented during recording and playback of these K−1 access blocks, enabling to assure the bit rate. Consequently, real time processing is realized in recording and playing back AV data.

Third Exemplary Embodiment

Data editing of disk recording media in a third exemplary embodiment of the present invention is described with reference to drawings. The third exemplary embodiment has the configuration equivalent to those described in FIGS. 10 and 11, and thus its explanation is omitted here.

To assure the bit rate in data editing in this exemplary embodiment, the length of access block to consecutively write in AV and other data, and the K−1 access blocks filled with data (hereafter referred to as "complete block") out of K access blocks are predetermined, and data editing is carried out using an algorithm satisfying the predetermined conditions. An access block searcher 243 has the capacity to store data of K pieces of access blocks, and comprises a K block shift register 245 for shifting data read out from an edit data accumulator 242 in every access block, and a block monitor 246 for monitoring the presence of access block not filled with data (hereafter referred to as "incomplete block") in K access blocks held in the K block shift register 245.

A data editing method in this exemplary embodiment is described next. Here, applicable source data for editing is AV data recorded in DVD-RAM. A part of the source data is replaced with other AV data (edit data) stored in a memory 228. The source data is recorded also based on the rule that data is for consecutively writing into K numbers of access blocks. FIG. 16 is a flow chart illustrating processing by a memory controller 232 in this exemplary embodiment. In FIG. 16, the edit controller 244 transfers the source data in the unit of file from DVD-RAM to the edit data accumulator 242 through the DVD-RAM drive 234 when data editing starts (Step S21). Then, the edit controller 244 reads out the source data from the edit data accumulator 242 for every access block, and transfers it to the access block searcher 243 (Step S22). Here, the access blocks of the source data are transferred to and held at the K-block shift register 245 of the access block searcher 243. The edit controller 244 initiates the block monitor 246 to check whether the access block at an edit start point is a complete block (Step S23). If the access block at the edit start point is an incomplete block, at least K−1 pieces of data recorded before the edit start point are consecutive complete blocks. Thus the source data from the edit start point is replaced with edit data read from the memory 228 as it is (Step S25). If the access block at the edit start point is the complete block, the block monitor 246 further checks whether there are K−1 complete blocks in K access blocks before the edit start point held in the K block shift register 245 (Step S24). This is called pre-reading time.

In this checking operation, if the number of complete blocks before the edit start point is K−1, it means that K−1 pieces of data before the edit start point are consecutive complete blocks. In this case, the source data from the edit start point is replaced with the edit data read from the memory 228 as it is (Step S25). If, in Step S24, there is no K−1 numbers of complete blocks before the edit start point, the editor 241 packs data in the block following the incomplete block found, after the last data in the incomplete block. Likewise, the rest of the data is sequentially advanced to turn an incomplete block into a complete block (Step S26). After the packing, the source data from the edit start point is replaced with the edit data (Step S27). With the above processes, at least K−1 pieces of data become consecutive complete blocks, thus reducing the occurrence of seek during playback. After editing, the edit data accumulator 242 temporarily stores edited data (Step S28), and then DVD-RAM drive 234 writes the edited data in the specified position on the DVD-RAM (Step S29).

Fourth Exemplary Embodiment

The third exemplary embodiment described above involves editing based on the edit start point of the source data. Another method is described in a fourth exemplary embodiment. The fourth exemplary embodiment involves editing based on the edit end point of the source data, and is described with reference to a flow chart illustrated in FIG. 17. In FIG. 17, the edit controller 244 transfers the source data in the unit of file from a DVD-RAM to the edit data accumulator 242 through the DVD-RAM drive 234 when data editing starts (Step S31). Next, the edit controller 244 reads out the source data from the edit data accumulator 242 for every access block, and transfers them to the access block searcher 243 (Step S32). Here, the access blocks of the source data are transferred to and held at the K block shift register 245 of the access block searcher 243. The edit controller 244 initiates the block monitor 246 to check whether the access block at the edit end point is a complete block (Step S33). If the access block at the edit end point is an incomplete block, at least K−1 pieces of data recorded after the edit end point are consecutive complete blocks. The source data before the edit end point is thus replaced with edit data read from the memory 228 as it is (Step S35). Then, the source data after the edit end point is added after the edit data to eliminate the spaces in the data (Step S36).

On the other hand, if the access block at the edit end point is a complete block, the block monitor 246 further checks whether there are K−1 complete blocks in K access blocks after the edit end point held in the K block shift register 245 (Step S34). This is called post-reading time. In this checking operation, if the number of complete blocks after the edit end point is K−1, it means that K−1 pieces of data after the edit end point are consecutive complete blocks. Accordingly, the source data before the edit end point is replaced with the edit data read from the memory 228 as it is (Step S35). The source data after the edit end point is then added after the edit data to eliminate any spaces in the data (Step S36). If the number of complete blocks after the edit end point does not equal K−1, the editor 241 packs data in the block following the incomplete block found, after the last data in the incomplete block. Likewise, the rest of the data is sequentially advanced to turn an incomplete block into a complete block (Step S37). After packing, the source data before the edit end point is replaced with edit data (Step S38). With the above operations, complete blocks continue for at least K−1 pieces of data, thus reducing occurrence of seek during playback. After editing, the edit data accumulator 242 temporarily stores the edited data (Step S39), and then the DVD-RAM drive 234 writes the edited data in the specified position on the DVD-RAM (Step S40).

In the third and fourth exemplary embodiments, the length of source data from the edit start point to the edit end point may not be equivalent to the length of edit data to be replaced. If the edit data length is within the edit region of the source data, edit data is recordable in that region. If not, it will be recorded in other empty data regions. If the data position is changed during data editing, the changed points are recorded in the directory region so that data is written on the DVD-RAM according to the changed directory.

Also in the third and fourth exemplary embodiments, a method for reading and confirming K numbers of access blocks before the edit start point or after the edit end point is employed for checking the presence of K−1 numbers of complete blocks before the edit start point or after the edit end point of the source data to be edited. Another method is to provide a table for controlling the number of consecutive complete blocks in the directory region, and read this information as required. Still another method is to put a flag indicating a complete or incomplete block at a specified position such as at the head of each access block, and read this information as required. Step S23 in FIG. 16 and Step S33 in FIG. 17 are not always necessary. However, these steps give the advantage of reducing the calculation load during execution of the program.

Figure 18:
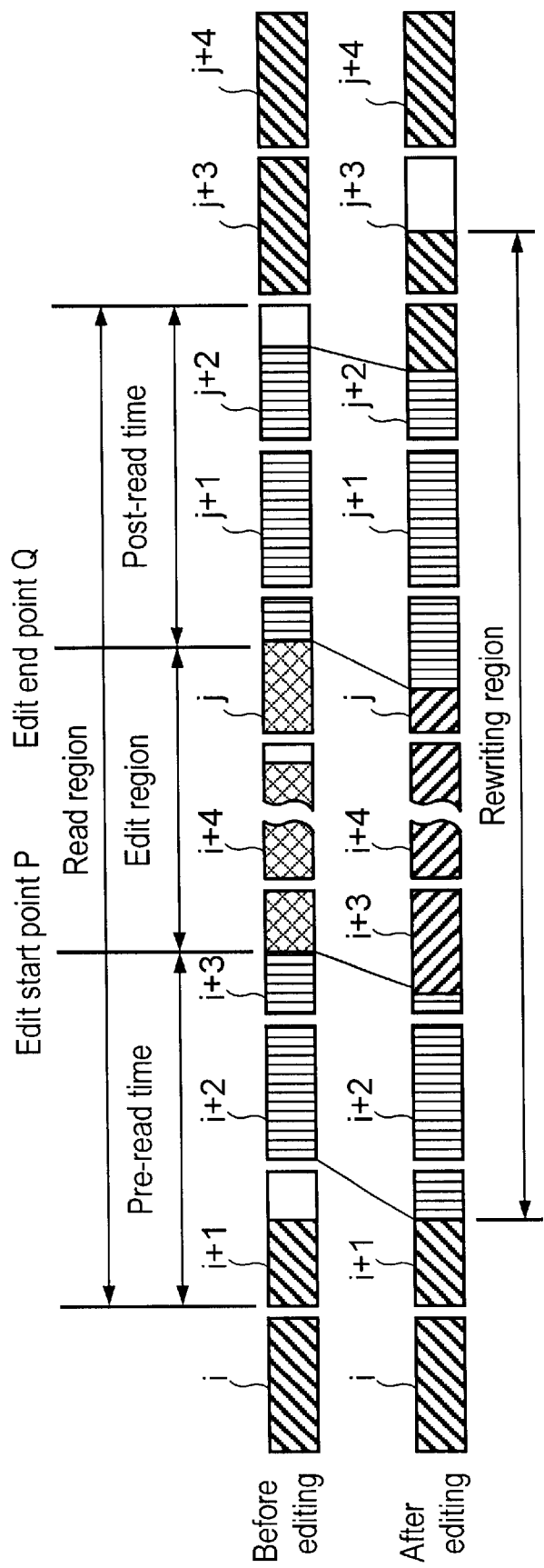
FIG. 18 is a schematic view of data editing in accordance with third and fourth exemplary embodiments of the present invention.

FIG. 18 illustrates the processing described in the third and fourth exemplary embodiments. As shown in FIG. 18, the data area in a disk recording medium is divided into multiple consecutive access blocks i, i+1, i+2, i+3, i+4, . . . j, j+1, j+2, j+3, . . . , and so on with a specified block length. There are two ways to divide data into such access blocks. One is to physically divide data area in the disk recording medium, i.e., to divide into consecutive access blocks according to physical address. The other is to divide the data into consecutive access blocks in logic addresses without physically dividing it into consecutive access blocks. In both cases, data recording and playback are applied to access blocks with consecutive addresses. In FIG. 18, numbers are simplified to K=3 and K−1=2. In the third exemplary embodiment, it is assumed that the edit start point P is at access block i+3, and the second block before the edit start point block P, i.e. access block i+1, is an incomplete block. The following data is sequentially packed into this block to make it a complete block, and then the source data in the edit region is replaced with edit data. In the same way, in the fourth exemplary embodiment, it is assumed the edit end point Q is at an access block j, and the second block from the block of the edit end point Q, i.e. access block j+2, is an incomplete block. In this case, the following data is packed in this block to make it a complete block, and then the source data in the edit region before the edit end point Q is replaced with edit data.

It is apparent from the third and fourth exemplary embodiments that the data area in a disk recording medium is divided into multiple consecutive access blocks with a specified block length, and K−1 numbers of access blocks filled with data, out of K numbers of access blocks, for writing in consecutive data, are predetermined. During data editing, the presence of K−1 numbers for access blocks filled with data before the edit start point or after the edit end point of the source data to be edited is confirmed. If K−1 numbers of complete blocks are confirmed, data editing is executed from the edit start point or before the edit end point. If K−1 numbers of complete blocks are not confirmed, data is packed to the last piece of data in an access block not filled with data, to make it a complete access block, following which editing is executed. With the above editing processes, at least all K−1 numbers of consecutive access blocks are filled with is data, and thus consecutive playback is secured for these access blocks. Accordingly, the average bit rate is assurable, which means the bit rate and real time processing are assured even if editing is executed many times.

As described above in the first to fourth exemplary embodiments, the present invention enables the reduction of read time by eliminating the need for repetitive seek operations or suppressing occurrence of seek below a specified level for reading data during copying or editing data recorded on a disk to another disk. The present invention further assures a preferable bit rate and real time processing during editing of AV data.

What is claimed is:

1. A method for copying data in a disk recording medium, wherein data is read out from a copy source in one way of i) without executing seeking, and ii) suppressing the occurrence of seeking below a specified value, during copying of data recorded in one disk recording medium in which one and more tracks for recording data are divided into blocks with a specified length to another disk recording medium, and is transferred to a copy target disk; and the data structure of the copy source is maintained at the copy target disk by one of i) rearranging each file, and ii) rewriting file control information at the copy target disc.

2. The method for copying data in a disk recording medium as defined in claim 1, wherein data is consecutively read without seeking at the copy source.

3. The method for copying data in a disk recording medium as defined in claim 1, wherein seeking is executed only for neighboring tracks below a specified value at the copy source while reading data.

4. The method for copying data in a disk recording medium as defined in claim 1, wherein an apparatus itself adaptatively controls execution of i) continuous reading without seek, and ii) reading with seek only for neighboring tracks, in accordance with transfer capacity and transfer time.

5. The method for copying data in a disk recording medium as defined in claim 1, wherein a recording position of actual data is sequentially determined at the copy target-based on file control information transferred from the copy source, in order to record data physically consecutive.

6. The method for copying data in a disk recording medium as defined in claim 1, wherein after sequentially recording actual data transferred from the copy source at the copy target, file control information transferred from the copy source is modified in order to consecutively read out the actual data at the copy target.

7. The method for copying data in a disk recording medium as defined in claim 1, said method comprising the steps of:
   reading file control information of a file recorded in a copy source disk;
   consecutively reading at least a part of data recorded in a data region of said file, ignoring said file control information;
   reading file control information of a copy target disk;
   recording said data which is consecutively read, ignoring said file control information, onto the copy target disk; and
   recording the file control information on recorded data to the copy target disk.

8. The method for copying data in a disk recording medium as defined in claim 7 further comprising the step of determining execution of one of the next operations, based on the file control information of said copy source disk:
   i) read data recorded in the data region of said file based on the file control information of said copy source disk; and
   ii) read consecutively.

9. The method for copying data in a disk recording medium as defined in claim 7 further comprising the step of determining execution of one of the next operations, based on information other than the file control information of said copy source disk:
   i) read data recorded in the data region of said file based on the file control information of said copy source disk; and
   ii) read consecutively.

10. The method for copying data in a disk recording medium as defined in claim 9, wherein said information other than the file control information of said copy source disk is at least one of i) capacity of said file, ii) the number of seeking at reading data, and iii) instructions given through a control panel.

11. The method for copying data in a disk recording medium as defined in claim 1, wherein the data is processed in a way that the number of blocks not fully recorded with data in specified K successive blocks (K is an integer number) is not greater than one in said copy target disk in which one and more tracks for recording data are divided into blocks with a specified length.

12. The method for copying data in a disk recording medium as defined in claim 2, wherein a recording position of actual data is sequentially determined at the copy target based on file control information transferred from the copy source, in order to record data physically consecutive.

13. The method for copying data in a disk recording medium as defined in claim 3, wherein a recording position of actual data is sequentially determined at the copy target based on file control information transferred from the copy source, in order to record data physically consecutive.

14. The method for copying data in a disk recording medium as defined in claim 4, wherein a recording position of actual data is sequentially determined at the copy target based on file control information transferred from the copy source, in order to record data physically consecutive.

15. The method for copying data in a disk recording medium as defined in claim 2, wherein after sequentially recording actual data transferred from the copy source at the copy target, file control information transferred from the copy source is modified in order to consecutively read out the actual data at the copy target.

16. The method for copying data in a disk recording medium as defined in claim 3, wherein after sequentially recording actual data transferred from the copy source at the copy target, file control information transferred from the copy source is modified in order to consecutively read out the actual data at the copy target.

17. The method for copying data in a disk recording medium as defined in claim 4, wherein after sequentially recording actual data transferred from the copy source at the copy target, file control information transferred from the copy source is modified in order to consecutively read out the actual data at the copy target.

18. The method for copying data in a disk recording medium as defined in claim 2, wherein the data is processed in a way that the number of blocks not fully recorded with data in specified K successive blocks (K is an integer number) is not greater than one in said copy target disk in which one and more tracks for recording data are divided into blocks with a specified length.

19. The method for copying data in a disk recording medium as defined in claim 3, wherein the data is processed in a way that the number of blocks not fully recorded with data in specified K successive blocks (K is an integer number) is not greater than one in said copy target disk in which one and more tracks for recording data are divided into blocks with a specified length.

20. The method for copying data in a disk recording medium as defined in claim 4, wherein the data is processed in a way that the number of blocks not fully recorded with data in specified K successive blocks (K is an integer number) is not greater than one in said copy target disk in which one and more tracks for recording data are divided into blocks with a specified length.

21. The method for copying data in a disk recording medium as defined in claim 5, wherein the data is processed in a way that the number of blocks not fully recorded with data in specified K successive blocks (K is an integer number) is not greater than one in said copy target disk in which one and more tracks for recording data are divided into blocks with a specified length.

22. The method for copying data in a disk recording medium as defined in claim 6, wherein the data is processed in a way that the number of blocks not fully recorded with data in specified K successive blocks (K is an integer number) is not greater than one in said copy target disk in which one and more tracks for recording data are divided into blocks with a specified length.

23. The method for copying data in a disk recording medium as defined in claim 7, wherein the data is processed in a way that the number of blocks not fully recorded with data in specified K successive blocks (K is an integer number) is not greater than one in said copy target disk in which one and more tracks for recording data are divided into blocks with a specified length.

24. The method for copying data in a disk recording medium as defined in claim 8, wherein the data is processed in a way that the number of blocks not fully recorded with data in specified K successive blocks (K is an integer number) is not greater than one in said copy target disk in which one and more tracks for recording data are divided into blocks with a specified length.

25. The method for copying data in a disk recording medium as defined in claim 9, wherein the data is processed in a way that the number of blocks not fully recorded with data in specified K successive blocks (K is an integer number) is not greater than one in said copy target disk in which one and more tracks for recording data are divided into blocks with a specified length.

26. The method for copying data in a disk recording medium as defined in claim 10, wherein the data is processed in a way that the number of blocks not fully recorded with data in specified K successive blocks (K is an integer number) is not greater than one in said copy target disk in which one and more tracks for recording data are divided into blocks with a specified length.

27. The method for copying data in a disk recording medium as defined in claim 12, wherein the data is processed in a way that the number of blocks not fully recorded with data in specified K successive blocks (K is an integer number) is not greater than one in said copy target disk in which one and more tracks for recording data are divided into blocks with a specified length.

28. The method for copying data in a disk recording medium as defined in claim 13, wherein the data is processed in a way that the number of blocks not fully recorded with data in specified K successive blocks (K is an integer number) is not greater than one in said copy target disk in which one and more tracks for recording data are divided into blocks with a specified length.

29. The method for copying data in a disk recording medium as defined in claim 14, wherein the data is processed in a way that the number of blocks not fully recorded with data in specified K successive blocks (K is an integer number) is not greater than one in said copy target disk in which one and more tracks for recording data are divided into blocks with a specified length.

30. The method for copying data in a disk recording medium as defined in claim 15, wherein the data is processed in a way that the number of blocks not fully recorded with data in specified K successive blocks (K is an integer number) is not greater than one in said copy target disk in which one and more tracks for recording data are divided into blocks with a specified length.

31. The method for copying data in a disk recording medium as defined in claim 16, wherein the data is processed in a way that the number of blocks not fully recorded with data in specified K successive blocks (K is an integer number) is not greater than one in said copy target disk in which one and more tracks for recording data are divided into blocks with a specified length.

32. The method for copying data in a disk recording medium as defined in claim 17, wherein the data is processed in a way that the number of blocks not fully recorded with data in specified K successive blocks (K is an integer number) is not greater than one in said copy target disk in which one and more tracks for recording data are divided into blocks with a specified length.

* * * * *